(12) United States Patent
Harada et al.

(10) Patent No.: US 10,440,797 B2
(45) Date of Patent: Oct. 8, 2019

(54) LIGHTING DEVICE AND ILLUMINATING FIXTURE

(71) Applicant: Panasonic Intellectual Property Management Co., Ltd., Osaka (JP)

(72) Inventors: Kazuhiko Harada, Hyogo (JP); Akira Nakajo, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 195 days.

(21) Appl. No.: 15/606,169

(22) Filed: May 26, 2017

(65) Prior Publication Data

US 2017/0347414 A1 Nov. 30, 2017

(30) Foreign Application Priority Data

May 30, 2016 (JP) .................................. 2016-107877

(51) Int. Cl.
 *H05B 33/08* (2006.01)
(52) U.S. Cl.
 CPC ....... *H05B 33/089* (2013.01); *H05B 33/0815* (2013.01); *H05B 33/0845* (2013.01); *Y02B 20/341* (2013.01)
(58) Field of Classification Search
 CPC .............. H05B 33/089; H05B 33/0815; H05B 33/0845
 See application file for complete search history.

(56) References Cited

U.S. PATENT DOCUMENTS

| | | | | |
|---|---|---|---|---|
| 2004/0178784 | A1* | 9/2004 | Okamoto | ............ H02M 1/4225 323/283 |
| 2012/0187847 | A1* | 7/2012 | Hamamoto | ........ H05B 33/0815 315/125 |
| 2016/0276929 | A1* | 9/2016 | Amei | ................... H02H 7/1213 |

FOREIGN PATENT DOCUMENTS

| | | |
|---|---|---|
| EP | 2 525 627 A2 | 11/2012 |
| JP | 2012-244737 A | 12/2012 |

* cited by examiner

*Primary Examiner* — Douglas W Owens
*Assistant Examiner* — Pedro C Fernandez
(74) *Attorney, Agent, or Firm* — Renner, Otto, Boisselle & Sklar, LLP

(57) ABSTRACT

The lighting device includes a power conversion circuit and a control circuit. The power conversion circuit includes a high voltage side output terminal and a low voltage side output terminal to be connected to a light source, and a step-down chopper circuit. The control circuit performs a lighting operation of controlling the power conversion circuit to develop a DC output voltage between the high voltage side output terminal and the low voltage side output terminal. The control circuit starts a protective operation of limiting a current to be supplied to the light source when the output voltage is equal to or higher than a threshold value. The threshold value is in a range of 1.2 to 1.3 times a rated voltage of the light source.

11 Claims, 2 Drawing Sheets

US 10,440,797 B2

LIGHTING DEVICE AND ILLUMINATING FIXTURE

CROSS-REFERENCE TO RELATED APPLICATIONS

The present application is based upon and claims the benefit of priority of Japanese Patent Application No. 2016-107877, filed on May 30, 2016, the entire contents of which are incorporated herein by reference.

TECHNICAL FIELD

The present disclosure relates to lighting devices and illuminating fixtures, and in particular to a lighting device and an illuminating fixture which include a step-down chopper circuit.

BACKGROUND ART

In the past, there have been proposed various lighting devices including light-emitting diode (LED) feeding devices. For example, JP 2012-244737 A discloses an LED feeding device configured to turn on an LED (light source) with power supplied from an AC power supply (power supply). The LED feeding device of JP 2012-244737 A includes an output power adjusting circuit (step-down chopper circuit) including a switch device and operating to extract desired power for the LED, and a driving circuit to drive the switch device. Further, the LED feeding device of JP 2012-244737 A includes a stop control circuit to determine whether the LED is present or absent based on detection of a current flowing through the LED and to stop the drive circuit when determining that the LED is absent.

The LED feeding device of JP 2012-244737 A may have a probability that the switch device (step-down switching device) of the step-down chopper circuit is short circuited. If the step-down switching device is short circuited, the voltage of the AC power supply may be applied across the LED and this may cause an excess current to flow through the LED. The LED feeding device of JP 2012-244737 A can determine whether the LED is present or absent, but cannot detect short circuit of the step-down switching device.

SUMMARY

An object of the present disclosure would be to propose a lighting device and an illuminating fixture which are capable of protecting a light source when the step-down switching device of the step-down chopper circuit is short circuited.

A lighting device of one aspect according to the present disclosure includes a power conversion circuit, a control circuit, and a determination circuit. The power conversion circuit includes a high voltage side input terminal and a low voltage side input terminal, a high voltage side output terminal and a low voltage side output terminal, and a step-down chopper circuit. The high voltage side input terminal and the low voltage side input terminal are for receiving power from a power supply. The high voltage side output terminal and the low voltage side output terminal are to be connected to a light source. The step-down chopper circuit includes a step-down switching device electrically connected between the high voltage side input terminal and the high voltage side output terminal. The control circuit is configured to perform a lighting operation. The lighting operation is an operation of controlling the power conversion circuit to develop a DC output voltage between the high voltage side output terminal and the low voltage side output terminal based on a voltage between the high voltage side input terminal and the low voltage side input terminal. The determination circuit is configured to determine whether or not an output voltage between the high voltage side output terminal and the low voltage side output terminal is equal to or higher than a threshold value. The control circuit is configured to start a protective operation of limiting a current to be supplied to the light source when the determination circuit determines that the output voltage is equal to or higher than the threshold value. The threshold value is in a range of 1.2 to 1.3 times a rated voltage of the light source.

An illuminating fixture of one aspect according to the present disclosure includes the lighting device of the above aspect and the light source.

BRIEF DESCRIPTION OF THE DRAWINGS

The figures depict one or more implementations in accordance with the present teaching, by way of example only, not by way of limitation. In the figures, like reference numerals refer to the same or similar elements.

DETAILED DESCRIPTION

1. Embodiment

Figure 1:
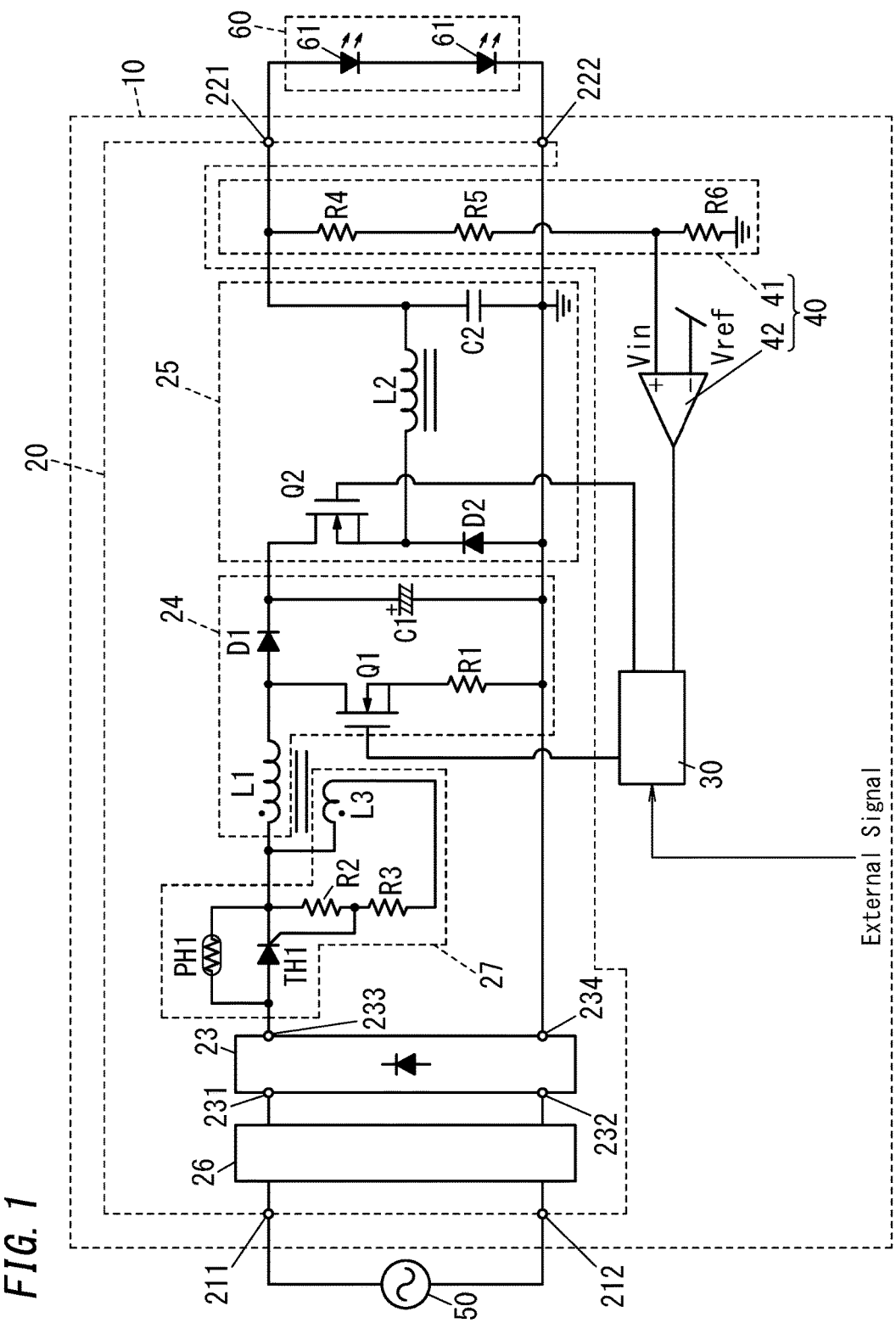
FIG. 1 is a circuit diagram of the lighting device of one embodiment according to the present disclosure.

FIG. 1 shows a lighting device 10 of one embodiment according to the present disclosure. The lighting device 10 is configured to light a light source 60 with power supplied from a power supply 50.

The light source 60 is a DC light source operating with DC power (DC voltage), for example. The light source 60 includes one or more light emitting devices 61, for example. The light source 60 may be a series circuit of light emitting devices 61, for example. The light emitting device 61 may be a solid light emitting device (for example, an LED, an organic electroluminescence element, and a laser diode), for example.

The power supply 50 is an AC power supply for supplying AC power (AC voltage), for example. The power supply 50 is a commercial AC power supply with an effective value of 200 V, for example.

The lighting device 10 includes a power conversion circuit 20, a control circuit 30, and a determination circuit 40.

The power conversion circuit 20 includes: a pair of input terminals 211 and 212 to be connected to the power supply 50; and a pair of output terminals (a high voltage side output terminal and a low voltage side output terminal) 221 and 222 (respectively) to be connected to the light source 60. Further, the power conversion circuit 20 includes a rectification circuit 23, a step-up chopper circuit 24, a step-down chopper circuit 25, a filter circuit 26, and a protective circuit 27.

The rectification circuit 23 is configured to rectify the AC voltage to output a DC voltage. The rectification circuit 23 includes, for example, a pair of input terminals 231 and 232, and a pair of output terminals 233 and 234. The pair of input terminals 231 and 232 are electrically connected to the pair of input terminals 211 and 212, individually, via the filter circuit 26. The rectification circuit 23 rectifies the AC voltage applied between the pair of input terminals 231 and 232, and develops the DC voltage (a pulsating voltage in a case of a sinusoidal AC voltage) between the pair of output terminals 233 and 234. For example, when the power supply 50 is a commercial AC power supply with an effective value of 200 V, a voltage of up to 280 V may be developed between the pair of output terminals 233 and 234. As to the power conversion circuit 20, the pair of output terminals 233 and 234 also serves as a high voltage side input terminal and a low voltage side input terminal for receiving power from the power supply 50. Hereinafter, the output terminal 233 and the output terminal 234 are also referred to as the high voltage side input terminal 233 and the low voltage side input terminal 234, respectively. The rectification circuit 23 is a diode bridge for full-wave rectification, for example.

The step-up chopper circuit 24 is configured to increase a voltage between the pair of output terminals 233 and 234 of the rectification circuit 23 and output a resultant voltage. The step-up chopper circuit 24 may serve as a power factor correction circuit. The step-up chopper circuit 24 includes a series circuit of an inductor L1 and a diode D1, and the series circuit is electrically connected to the high voltage side input terminal 233, for example. The step-up chopper circuit 24 further includes a switching device (step-up switching device) Q1 connected between a junction of the inductor L1 and the diode D1, and the low voltage side input terminal 234. In more detail, the step-up chopper circuit 24 includes the inductor L1, the diode D1, the switching device Q1, a resistor R1, and a capacitor C1. The inductor L1 has a first end electrically connected to the output terminal (high voltage side input terminal) 233 of the rectification circuit 23, and a second end electrically connected to an anode of the diode D1. Further, the inductor L1 has the second end electrically connected to the output terminal (low voltage side input terminal) 234 through the series circuit of the switching device Q1 and the resistor R1. The switching device Q1 is, for example, a semiconductor switching device such as a field effect transistor (FET). The capacitor C1 is electrically connected between a cathode of the diode D1 and the output terminal 234. A voltage across the capacitor C1 defines the output voltage of the step-up chopper circuit 24. The step-up chopper circuit 24 develops a DC voltage across the capacitor C1 which is higher than an input voltage (voltage between the pair of output terminals 233 and 234 of the rectification circuit 23) by a switching operation of the switching device Q1. Note that, the step-up chopper circuit 24 may have known configuration, and therefore more detailed explanation thereof may be omitted for sake of brevity.

The step-down chopper circuit 25 is configured to decrease the output voltage of the step-up chopper circuit 24 and output a resultant voltage. The step-down chopper circuit 25 includes a switching device (step-down switching device) Q2 electrically connected between the high voltage side input terminal 233 and the high voltage side output terminal 221, for example. In more detail, the step-down chopper circuit 25 includes the switching device Q2, an inductor L2, a diode D2, and a capacitor C2. The switching device Q2 is, for example, a semiconductor switching device such as a field effect transistor (FET). As described above, the switching device Q2 is electrically connected between the high voltage side input terminal 233 and the high voltage side output terminal 221. In other words, the switching device Q2 is on a high side of the step-down chopper circuit 25 (stated differently, a high voltage side path between the high voltage side input terminal 233 and the high voltage side output terminal 221). The diode D2 has a cathode electrically connected to the cathode of the diode D1 through the switching device Q2, and an anode electrically connected to the output terminal 234. The inductor L2 has a first end electrically connected to a junction of the switching device Q2 and the diode D2, and a second end electrically connected to the output terminal 234 through the capacitor C2. The capacitor C2 has opposite ends electrically connected to the pair of output terminals 221 and 222, individually. A voltage across the capacitor C2 defines the output voltage of the step-down chopper circuit 25, and this output voltage is applied across the light source 60 through the pair of output terminals 221 and 222. The step-down chopper circuit 25 develops a DC voltage across the capacitor C2 which is lower than an input voltage (output voltage of the step-up chopper circuit 24) by a switching operation of the switching device Q2. Note that, the step-down chopper circuit 25 may have known configuration, and therefore more detailed explanation thereof may be omitted for sake of brevity.

The filter circuit 26 is, for example, configured to remove a high frequency component from the AC voltage supplied from the power supply 50. The filter circuit 26 includes a pair of low-pass filters one of which is interposed between the input terminal 211 and the input terminal 231, and the other of which is interposed between the input terminal 212 and the input terminal 232, for example. Note that, the filter circuit 26 is optional.

The protective circuit 27 has a function of limiting a current supplied to the light source 60. The protective circuit 27 includes, for example, a switch TH1, a positive temperature coefficient thermistor (PTC thermistor) PH1, resistors R2 and R3, and an auxiliary inductor L3. The switch TH1 is electrically connected between the output terminal 233 and the inductor L1. The switch TH1 is, for example, a thyristor (three terminal thyristor), and has an anode electrically connected to the output terminal 233 and a cathode electrically connected to the inductor L1 and a first end of a series circuit of the resistors R2 and R3. The PTC thermistor PH1 is connected in parallel with the switch TH1. The auxiliary inductor L3 is magnetically coupled with the inductor L1. The auxiliary inductor L3 has a first end electrically connected to the first end of the inductor L1, and a second end electrically connected to the second end of the series circuit of the resistors R2 and R3. The switch TH1 has a gate electrically connected to a junction of the resistors R2 and R3. Thus, the switch TH1 receives an inductive voltage of the auxiliary inductor L3 by its gate. Accordingly, when the inductive voltage of the auxiliary inductor L3 becomes equal to or higher than a predetermined voltage (a breakover voltage of the switch TH1), the switch TH1 turns on.

As described above, the protective circuit 27 includes the switch TH1 electrically connected in series with the switching device Q2 between the output terminal (high voltage side input terminal) 233 and the output terminal (high voltage side output terminal) 221. Additionally, the protective circuit 27 includes the auxiliary inductor L3 magnetically coupled with the inductor L1, and the positive temperature coefficient thermistor PH1 connected in parallel with the switch TH1. The switch TH1 is configured to turn on when the inductive voltage of the auxiliary inductor L3 is equal to or higher than the predetermined voltage.

In a time period in which the switch TH1 is on, the protective circuit 27 allows a current to flow from the rectification circuit 23 to the step-up chopper circuit 24 through the switch TH1. In contrast, when the switch TH1 is turned off, a current starts to flow from the rectification circuit 23 to the step-up chopper circuit 24 through the PTC thermistor PH1. In this regard, a continuous flow of a current through the PTC thermistor PH1 may cause an increase in a temperature of the PTC thermistor PH1. When the temperature of the PTC thermistor PH1 exceeds the C-point (Curie point), a resistance of the PTC thermistor PH1 increases drastically. As a result, the PTC thermistor PH1 does not allow a current to flow therethrough. When a current no longer flows through the PTC thermistor PH1, the temperature of the PTC thermistor PH1 starts to decrease, and this leads to a decrease in the resistance of the PTC thermistor PH1. Consequently, the PTC thermistor PH1 allows a current to flow threrethrough, again. However, the temperature of the PTC thermistor PH1 may reach the Curie point, again, and thus the PTC thermistor PH1 does not allow a current to flow therethrough. Accordingly, the protective circuit 27 causes a current to flow intermittently to the light source 60. Thus, the protective circuit 27 limits a current supplied to the light source 60.

The aforementioned protective circuit 27 has a relatively simple circuit configuration yet can limit a current supplied to the light source 60. Additionally, the control circuit 30 can turn off the switch TH1 by use of the step-up switching device Q1. This may lead to a decrease in the number of parts, compared to a case of adding a new circuit for allowing the control circuit 30 to control the switch TH1.

The determination circuit 40 is configured to determine whether or not a voltage (that is an output voltage of the power conversion circuit 20) between the pair of output terminals (the high voltage side output terminal and the low voltage side output terminal) 221 and 222 is lower than a threshold value. The determination circuit 40 includes, for example, a voltage detection circuit 41 and a comparison circuit 42. The voltage detection circuit 41 is configured to measure the output voltage (applied voltage) between the pair of output terminals 221 and 222. The voltage detection circuit 41 is a voltage divider circuit including a series circuit of resistors R4, R5, and R6, and is electrically connected between the output terminal 221 and ground. The comparison circuit 42 is configured to make comparison between the output voltage measured by the voltage detection circuit 41 and the threshold value and output a result of the comparison to the control circuit 30. The comparison circuit 42 is, for example, a comparator. The comparison circuit 42 has a non-inverted input terminal electrically connected between the resistors R5 and R6 of the voltage detection circuit 41, and an inverted input terminal for receiving a voltage Vref corresponding to the threshold value. The comparison circuit 42 has an output terminal electrically connected to the control circuit 30. The output terminal of the comparison circuit 42 has a high level voltage when a voltage Vin (corresponding to the output voltage of the power conversion circuit 20) of the non-inverted input terminal is equal to or higher than the voltage Vref (corresponding to the threshold value) of the inverted input terminal, and has a low level voltage when the voltage Vin is lower than the voltage Vref.

The control circuit 30 is configured to control the switching device Q1 of the step-up chopper circuit 24 and the switching device Q2 of the step-down chopper circuit 25. The control circuit 30 may be a microcomputer, and perform operations described below by executing one or more programs stored in its memory, for example.

The control circuit 30 is configured to perform a lighting operation and a protective operation, for example.

The lighting operation is defined as an operation of controlling the power conversion circuit 20 to develop a DC output voltage between the high voltage side output terminal 221 and the low voltage side output terminal 222 based on a voltage between the high voltage side input terminal 233 and the low voltage side input terminal 234 (that is, the voltage of the power supply 50).

Particularly, in the lighting operation, the control circuit 30 performs constant current control of supplying a constant current to the light source 60. For example, the control circuit 30 adjusts the DC output voltage so that a current with a desired value flows through the light source 60. For example, the control circuit 30 has a function of measuring a current flowing through the light source 60, and adjusts the DC output voltage so that the current flowing through the light source 60 has the desired value. The desired value can be determined by an external signal given to the control circuit 30, for example. Examples of the external signal include a dimming signal indicative of a dimming level of the light source 60. The control circuit 30 determines the desired value for the constant current according to the dimming level. The dimming level can be expressed as a percentage of an upper limit of a predetermined range (available range) of light output of the light source 60. Note that, a current and a voltage which correspond to the upper limit of the available range are individually referred to as a rated current and a rated voltage (or a steady-state voltage).

For example, the control circuit 30 is configured to control the power conversion circuit 20 by switching control of the step-up switching device Q1 and the step-down switching device Q2 in the lighting operation. Stated differently, the control circuit 30 performs PWM control of the switching device Q1 and the switching device Q2 according to the dimming level, thereby supplying a constant current corresponding to the dimming level to the light source 60.

When the determination circuit 40 determines that the output voltage of the power conversion circuit 20 is equal to or higher than the threshold value, the control circuit 30 starts the protective operation. In other words, the control circuit 30 performs the lighting operation when the output terminal of the comparison circuit 42 has a low level voltage, and performs the protective operation when the output terminal of the comparison circuit 42 has a high level voltage.

The protective operation is defined as an operation of limiting a current flowing through the light source 60. The control circuit 30 is configured to keep the switch TH1 off in the protective operation. In more detail, the control circuit 30 is configured to, in the protective operation, keep the switching device Q1 off to keep the inductive voltage of the auxiliary inductor L3 lower than the predetermined voltage. In this state, when a current no longer flows through the switch TH1, the switch TH1 turns off. As described above, when the switch TH1 is off, the protective circuit 27 causes a current to flow intermittently to the light source 60. Accordingly, the protective operation of limiting the current supplied to the light source 60 includes causing the current to flow only intermittently during the protective operation.

The control circuit 30 is configured to end the protective operation after a predetermined time from start of the protective operation has elapsed. In other words, the control circuit 30 ends the protective operation and resumes the lighting operation after the predetermined time from start of the protective operation has elapsed. The predetermined time may preferably be relatively short time. However, the predetermined time is set to be longer than time necessary for the temperature of the PTC thermistor PH1 to reach the Curie point. Therefore, the predetermined time is set to include at least one time period in which no current flows through the light source 60. The predetermined time may be in a range of 0.5 second to 1.0 second, for example.

Additionally, the control circuit 30 is configured not to end the protective operation even after the predetermined time from the start of the protective operation has elapsed in the event that the control circuit 30 has started and ended the protective operation a predetermined number of times within a prescribed time. The predetermined number of times may be equal to or larger than two, and may be three, for example. The prescribed time may be appropriately set in consideration of the predetermined number of times and the predetermined time. In particular, the prescribed time may be set to have a length enough to confirm that the abnormality (e.g., short circuit of the switching device Q2) has occurred.

In the present embodiment, the threshold value of the determination circuit 40 may be preferably set to allow the control circuit 30 to start the protective operation only when abnormality occurs actually. In this regard, when a difference between the threshold value and the rated voltage is small, the protective operation may be started due to noise or an individual difference of the light source 60, irrespective of absence of abnormality. In contrast, when the difference between the threshold value and the rated voltage is large, time from occurrence of abnormality to start of the protective operation may be prolonged. This may lead to an increase in probability that malfunction of the power conversion circuit 20 or the light source 60 occurs. Additionally, the threshold value may be preferably smaller than the maximum value of the voltage of the power supply 50. In consideration of these points, the threshold value of the determination circuit 40 is set to be in a range of 1.2 to 1.3 times the rated voltage of the light source 60. In other words, the threshold value is set to a value 20% to 30% larger than the rated voltage. Note that, the threshold value may be preferably set to be in a range of 1.2 to 1.25 times the rated voltage of the light source 60 (a value 20% to 25% larger than the rated voltage). Furthermore, the threshold value is set to be larger than an upper limit of a predefined range of an error of the rated voltage (for example, an error derived from an individual difference of the light source 60). Thus, it is possible to suppress the output voltage of the power conversion circuit 20 from increasing to be equal to or larger than the threshold value when no abnormality occurs. Only for one example, when the rated voltage is 178 V, the threshold value is set to 220 V. In this case, the error of the threshold value may be allowed when the error is about ±10 V.

Hereinafter, operations of the lighting device 10 are described.

In an initial state, the output voltage of the power conversion circuit 20 is lower than the threshold value. Therefore, in the determination circuit 40, the output terminal of the comparison circuit 42 has a low level voltage. Accordingly, the control circuit 30 starts the lighting operation. In the lighting operation, the control circuit 30 performs conventional switching control of the switching device Q1 and the switching device Q2 so that a current flowing through the light source 60 has the desired value. Note that, in the initial state, the switch TH1 of the protective circuit 27 is off, but a current is supplied from the rectification circuit 23 to the step-up chopper circuit 24 by way of the PTC thermistor PH1. The control circuit 30 performs the switching control of the switching device Q1, power is stored in the inductor L1 within a time period when the switching device Q1 is on, and this may cause the inductive voltage of the auxiliary inductor L3 and thus the switch TH1 is turned on. Thereafter, a current is supplied from the rectification circuit 23 to the step-up chopper circuit 24 by way of the switch TH1. As described above, the control circuit 30 performs the lighting operation, thereby lighting the light source 60 with power from the power supply 50. In this case, the output voltage of the power conversion circuit 20 is not equal to or larger than the threshold value, and thus the output terminal of the comparison circuit 42 does not have a high level voltage and the control circuit 30 does not perform the protective operation.

Next, an operation of the lighting device 10 in a case of occurrence of abnormality is described. For example, the switching device Q2 of the step-down chopper circuit 25 is assumed to be short circuited. In this case, the step-down chopper circuit 25 no longer works, the output voltage of the step-up chopper circuit 24 is given to the light source 60 without being substantially changed. As a result, the output voltage of the power conversion circuit 20 becomes equal to or higher than the threshold value. Accordingly, in the determination circuit 40, the output terminal of the comparison circuit 42 has a high level voltage. Therefore, the control circuit 30 ends the lighting operation and starts the protective operation. Thus, the control circuit 30 ends the switching control of the switching device Q1 of the step-up chopper circuit 24 and keeps the switching device Q1 off. Hence, the inductive voltage of the auxiliary inductor L3 becomes lower than the predetermined voltage. Consequently, the gate voltage of the switch TH1 also becomes lower than the breakover voltage. And, when the voltage of the output terminal 233 of the rectification circuit 23 becomes zero, a current no longer flows through the switch TH1, and thus the switch TH1 turns off. Thereafter, a current flows from the rectification circuit 23 to the step-up chopper circuit 24 by way of the PTC thermistor PH1. As a result, a current flows through the light source 60 intermittently as described above, and thus a current flowing through the light source 60 is limited. Consequently, the lighting device 10 can protect the light source 60 when the step-down switching device Q2 of the step-down chopper circuit 25 is short circuited.

After the predetermined time from start of the protective operation has elapsed, the control circuit 30 ends the protective operation and resumes the lighting operation. Thus, the switch TH1 is turned on, and then the output voltage is given from the step-up chopper circuit 24 to the step-down chopper circuit 25. However, the switching device Q2 is still short circuited, and thus the step-down chopper circuit 25 does not work, and the output voltage of the step-up chopper circuit 24 is given to the light source 60 without being substantially changed. Eventually, the output voltage of the power conversion circuit 20 (the voltage between the high voltage side output terminal 221 and the low voltage side output terminal 222) becomes equal to or higher than the threshold value. Thus, the control circuit 30 ends the lighting operation and resumes the protective operation. The control circuit 30 does not end the protective operation even after the predetermined time from the start of the protective operation has elapsed in the event the control circuit 30 determined it has performed the protective operation the predetermined number of times within the prescribed time. Therefore, a current supplied to the light source 60 is kept being limited. Therefore, the lighting operation is no longer repeated while the abnormality continues, and thus the light source 60 can be protected certainly.

The following description relates to an operation of the lighting device 10 in a case where the output voltage of the power conversion circuit 20 becomes equal to or higher than the threshold value temporarily due to noise or the like. In this situation, the control circuit 30 ends the lighting operation and starts the protective operation. After the predetermined time from start of the protective operation has elapsed, the control circuit 30 ends the protective operation and resumes the lighting operation. In this case, the switching device Q2 is not short circuited, and therefore the step-down chopper circuit 25 works normally, and the output voltage of the power conversion circuit 20 is kept lower than the threshold value. In the determination circuit 40, the output terminal of the comparison circuit 42 does not have a high level voltage. Accordingly, the control circuit 30 continues the lighting operation. Therefore, in a case where the output voltage of the power conversion circuit 20 becomes equal to or higher than the threshold value temporarily due to not the abnormality but noise or the like, recovery from the protective operation to the lighting operation is enabled.

Note that, absence of load may be considered as the abnormality. The absence of load means a state where the light source 60 is not electrically connected to the lighting device 10 (which may occur due to breakage of connection lines between the light source 60 and the lighting device 10). When the absence of load occurs, a value of a current flowing through the light source 60 becomes zero. Thus, the control circuit 30 controls the power conversion circuit 20 to increase the DC output voltage. Eventually, the output voltage of the power conversion circuit 20 becomes equal to or higher than the threshold value. Therefore, the control circuit 30 ends the lighting operation and starts the protective operation. For this reason, the lighting device 10 can protect the power conversion circuit 20 when absence of load occurs.

As described above, the lighting device 10 of the present embodiment can protect the light source 60 when the step-down switching device Q2 of the step-down chopper circuit 25 is short circuited. Further, the lighting device 10 can protect the power conversion circuit 20 when absence of load occurs.

Figure 2:
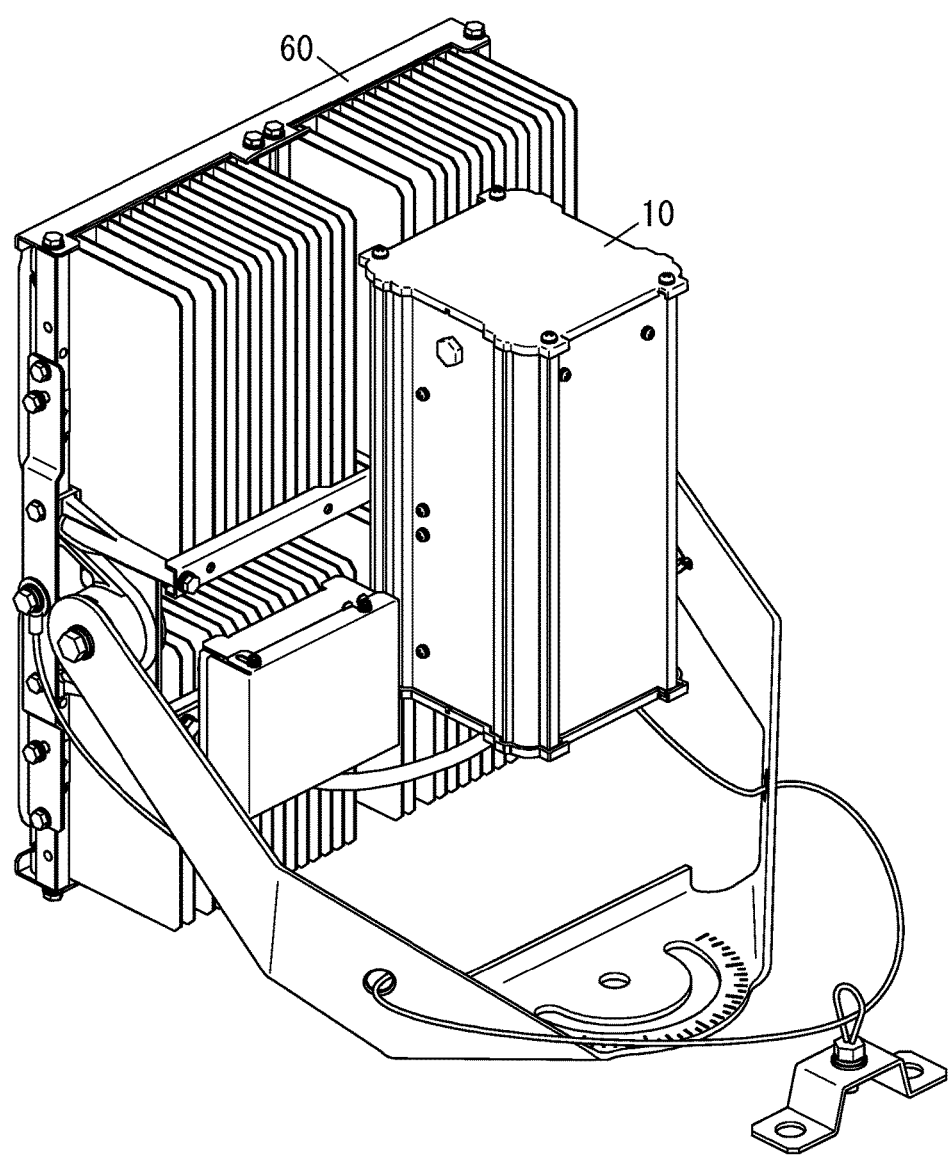
FIG. 2 is a rearward perspective view of an illuminating fixture including the above lighting device.

The aforementioned lighting device 10 may be included in an illuminating fixture as shown in FIG. 2, for example. The illuminating fixture of FIG. 2 includes the lighting device 10, and the light source 60 connected between the high voltage side output terminal 221 and the low voltage side output terminal 222 of the lighting device 10. The illuminating fixture of FIG. 2 is a flood light, for example. The lighting device 10 may apply to various illuminating fixtures (for example, base lights, spotlights, downlights, cyclorama lights) other than the flood lights. These illuminating fixtures can protect the light source 60 when the step-down switching device Q2 of the step-down chopper circuit 25 is short circuited.

2. Modifications

Embodiments of the present disclosure may not be limited to the above embodiment only. The above embodiment may be modified in various ways according to design or the like, providing that it can achieve the purpose of the present disclosure.

For example, in the above embodiment, the protective circuit 27 causes a current to flow intermittently to the light source 60, thereby limiting the current. In a modification, the protective circuit 27 may be configured to end supply of a current to the light source 60, or be configured to decrease a current supplied to the light source 60 to an extent not to cause undesired influence on the light source 60.

For example, in the above embodiment, the switch TH1 of the protective circuit 27 is a thyristor. In a modification, the switch TH1 may be a switching device such as a field effect transistor (FET).

For example, in the above embodiment, the control circuit 30 controls the switch TH1 by use of the switching device Q1 of the step-up chopper circuit 24. In a modification, the control circuit 30 may be configured to control the switch TH1 directly.

For example, in the above embodiment, the control circuit 30 ends the protective operation and resumes the lighting operation after the predetermined time from start of the protective operation has elapsed. In a modification, the control circuit 30 may continue the protective operation irrespective of the predetermined time once starting the protective operation.

In a modification, the power supply 50 may be a DC power supply. In this case, the rectification circuit 23 and the step-up chopper circuit 24 are optional. When there is no rectification circuit 23, the pair of input terminals 211 and 212 serve as the high voltage side input terminal and the low voltage side input terminal, instead of the output terminals 233 and 234. Further in this case, there is no time period when the power supply 50 has a voltage of zero, the switch TH1 of the protective circuit 27 may preferably be a switching device (for example, FET) other than a thyristor.

In a modification, the determination circuit 40 may have a function of inferring whether abnormality is a no-load or short circuit. For example, the determination circuit 40 infers, based on an amount of change in the output voltage of the power conversion circuit 20 per unit time, whether the abnormality is absence of load or short circuit. For example, the determination circuit 40 may infer that the abnormality is short circuit when the amount of change is equal to or larger than a prescribed value, and may infer that the abnormality is absence of load when the amount of change is smaller than the prescribed value. When inferring that the abnormality is short circuit, the determination circuit 40 may determine whether short circuit occurs, by comparison between the output voltage of the power conversion circuit 20 and a threshold value for short circuit. The threshold value for short circuit may be equal to or similar to the threshold value of the above embodiment. When inferring that the abnormality is absence of load, the determination circuit 40 may determine whether absence of load occurs, by comparison between the output voltage of the power conversion circuit 20 and a threshold value for absence of load. The threshold value for absence of load may be preferably larger than the threshold value for short circuit. In this case, the protective operation of the control circuit 30 may include a protective operation for absence of load, and a protective operation for short circuit. The protective operation for short circuit is an operation realized by use of the protective circuit 27 likewise the protective operation of the above embodiment. The protective operation for absence of load is defined as an operation of stopping the step-up chopper circuit 24 and the step-down chopper circuit 25 (that is, an operation of keeping the switching device Q1 and the switching device Q2 off), for example. In absence of load, the switching device Q2 is not short circuited, and thus the output voltage of the power conversion circuit 20 can be set to zero.

3. Aspects

As obviously derived from the above embodiment and modifications, the lighting device (10) of the first aspect includes a power conversion circuit (20), a control circuit (30), and a determination circuit (40). The power conversion circuit (20) includes a high voltage side input terminal (233) and a low voltage side input terminal (234), a high voltage side output terminal (221) and a low voltage side output terminal (222), and a step-down chopper circuit (25). The high voltage side input terminal (233) and the low voltage side input terminal (234) are for receiving power from a power supply (50). The high voltage side output terminal (221) and the low voltage side output terminal (222) are to be connected to a light source (60). The step-down chopper circuit (25) includes a step-down switching device (Q2) electrically connected between the high voltage side input terminal (233) and the high voltage side output terminal (221). The control circuit (30) is configured to perform a lighting operation. The lighting operation is an operation of controlling the power conversion circuit (20) to develop a DC output voltage between the high voltage side output terminal (221) and the low voltage side output terminal (222) based on a voltage between the high voltage side input terminal (233) and the low voltage side input terminal (234). The determination circuit (40) is configured to determine whether or not an output voltage between the high voltage side output terminal (221) and the low voltage side output terminal (222) is equal to or higher than a threshold value. The control circuit (30) is configured to start a protective operation of limiting a current supplied to the light source (60) when the determination circuit (40) determines that the output voltage is equal to or higher than the threshold value. The threshold value is in a range of 1.2 to 1.3 times a rated voltage of the light source (60).

Accordingly, the first aspect can protect the light source (60) when the step-down switching device (Q2) of the step-down chopper circuit (25) is short circuited.

The lighting device (10) of the second aspect would be realized in combination with the first aspect. In the second aspect, the threshold value is larger than an upper limit of a predefined range of an error of the rated voltage.

According to the second aspect, it is possible to suppress the output voltage from increasing to be equal to or larger than the threshold value when no abnormality occurs.

The lighting device (10) of the third aspect would be realized in combination with the first or second aspect. In the third aspect, the threshold value is smaller than a maximum value of a voltage of the power supply.

Accordingly, the third aspect can certainly detect short circuit of the step-down switching device (Q2).

The lighting device (10) of the fourth aspect would be realized in combination with any one of the first to third aspects. In the fourth aspect, the control circuit (30) is configured to end the protective operation after a predetermined time from start of the protective operation has elapsed.

According to the fourth aspect, in a case where the output voltage becomes equal to or higher than the threshold value temporarily due to not the abnormality but noise or the like, recovery from the protective operation to the lighting operation is enabled.

The lighting device (10) of the fifth aspect would be realized in combination with the fourth aspect. In the fifth aspect, the control circuit (30) is configured not to end the protective operation even after the predetermined time from the start of the protective operation has elapsed in the event that the control circuit (30) has started and ended the protective operation a predetermined number of times within a prescribed time.

According to the fifth aspect, the lighting operation is no longer repeated while the abnormality occurs, and thus the light source (60) can be protected certainly.

The lighting device (10) of the sixth aspect would be realized in combination with any one of the first to fifth aspects. In the sixth aspect, the power conversion circuit (20) includes a protective circuit (27). The protective circuit (27) includes a switch (TH1) connected in series with the step-down switching device (Q2) between the high voltage side input terminal (233) and the high voltage side output terminal (221). The control circuit (30) is configured to keep the switch (TH1) on in the lighting operation and to keep the switch (TH1) off in the protective operation.

According to the sixth aspect, it is possible to limit a current supplied to the light source (60) with a relatively simplified configuration.

The lighting device (10) of the seventh aspect would be realized in combination with the sixth aspect. In the seventh aspect, the power conversion circuit (20) further includes a step-up chopper circuit (24). The step-up chopper circuit (24) includes a series circuit of an inductor (L1) and a diode (D1) which is electrically connected to the high voltage side input terminal (233). Additionally, the step-up chopper circuit (24) includes a step-up switching device (Q1) connected between a junction of the inductor (L1) and the diode (D1) and the low voltage side input terminal (234). The step-down switching device (Q2) is electrically connected to the high voltage side input terminal (233) through the series circuit of the inductor (L1) and the diode (D1). The protective circuit (27) includes an auxiliary inductor (L3) magnetically coupled with the inductor (L1), and a positive temperature coefficient thermistor (PH1) connected in parallel with the switch (TH1). The switch (TH1) is configured to turn on when an inductive voltage of the auxiliary inductor (L3) is equal to or higher than a predetermined voltage. The control circuit (30) is configured to, in the lighting operation, perform switching control of both the step-up switching device (Q1) and the step-down switching device (Q2) to control the power conversion circuit (20). The control circuit (30) is configured to, in the protective operation, keep the step-up switching device (Q1) off to thereby make the inductive voltage be equal to or lower than the predetermined voltage.

The seventh aspect can turn off the switch (TH1) by use of the step-up switching device (Q1). Therefore it is possible to decrease the number of parts, compared to a case of adding a new circuit for allowing the control circuit (30) to control the switch (TH1).

The lighting device (10) of the eighth aspect would be realized in combination with the sixth aspect. In the eighth aspect, the control circuit (30) is configured to control the switch (TH1) directly.

According to the eighth aspect, it is possible to control the switch (TH1) with a relatively simplified configuration.

The lighting device (10) of the ninth aspect would be realized in combination with any one of the first to fifth aspects. In the ninth aspect, the protective operation of limiting the current supplied to the light source (60) comprises causing the current to flow only intermittently during the protective operation.

According to the ninth aspect, it is possible to limit a current supplied to the light source (60) with a relatively simplified configuration.

The lighting device (10) of the tenth aspect would be realized in combination with the ninth aspect. In the tenth aspect, the power conversion circuit (20) includes a protective circuit (27). The protective circuit (27) includes a switch (TH1) connected in series with the step-down switching device (Q2) between the high voltage side input terminal (233) and the high voltage side output terminal (221). The control circuit (30) is configured to keep the switch (TH1) on in the lighting operation and to keep the switch (TH1) off in the protective operation. The protective circuit (27) includes a positive temperature coefficient thermistor (PH1) connected in parallel with the switch (TH1).

According to the tenth aspect, it is possible to limit a current supplied to the light source (60) with a relatively simplified configuration.

The illuminating fixture of the eleventh aspect includes the lighting device (10) of any one of the first to tenth aspects, and the light source (60).

Accordingly, the eleventh aspect can protect the light source (60) when the step-down switching device (Q2) of the step-down chopper circuit (25) is short circuited.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device comprising:
a power conversion circuit including a high voltage side input terminal and a low voltage side input terminal for receiving power from a power supply, a high voltage side output terminal and a low voltage side output terminal to be connected to a light source, and a step-down chopper circuit including a step-down switching device electrically connected between the high voltage side input terminal and the high voltage side output terminal;
a control circuit configured to perform a lighting operation of controlling the power conversion circuit to develop a DC output voltage between the high voltage side output terminal and the low voltage side output terminal based on a voltage between the high voltage side input terminal and the low voltage side input terminal; and
a determination circuit configured to determine whether or not an output voltage between the high voltage side output terminal and the low voltage side output terminal is equal to or higher than a threshold value,
the control circuit being configured to start a protective operation of limiting a current supplied to the light source when the determination circuit determines that the output voltage is equal to or higher than the threshold value, and
the threshold value being in a range of 1.2 to 1.3 times a rated voltage of the light source.

2. The lighting device of claim 1, wherein the threshold value is larger than an upper limit of a predefined range of an error of the rated voltage.

3. The lighting device of claim 1, wherein the threshold value is smaller than a maximum value of a voltage of the power supply.

4. The lighting device of claim 1, wherein the control circuit is configured to end the protective operation after a predetermined time from start of the protective operation has elapsed.

5. The lighting device of claim 4, wherein the control circuit is configured not to end the protective operation even after the predetermined time from the start of the protective operation has elapsed in the event that the control circuit has started and ended the protective operation a predetermined number of times within a prescribed time.

6. The lighting device of claim 1, wherein:
the power conversion circuit includes a protective circuit;
the protective circuit includes a switch connected in series with the step-down switching device between the high voltage side input terminal and the high voltage side output terminal; and
the control circuit is configured to keep the switch on in the lighting operation and to keep the switch off in the protective operation.

7. The lighting device of claim 6, wherein:
the power conversion circuit further includes a step-up chopper circuit;
the step-up chopper circuit includes a series circuit of an inductor and a diode which is electrically connected to the high voltage side input terminal, and a step-up switching device connected between a junction of the inductor and the diode and the low voltage side input terminal;
the step-down switching device is electrically connected to the high voltage side input terminal through the series circuit of the inductor and the diode;
the protective circuit includes an auxiliary inductor magnetically coupled with the inductor, and a positive temperature coefficient thermistor connected in parallel with the switch;
the switch is configured to turn on when an inductive voltage of the auxiliary inductor is equal to or higher than a predetermined voltage;
the control circuit is configured to, in the lighting operation, perform switching control of both the step-up switching device and the step-down switching device to control the power conversion circuit; and
the control circuit is configured to, in the protective operation, keep the step-up switching device off to thereby make the inductive voltage be equal to or lower than the predetermined voltage.

8. The lighting device of claim 6, wherein:
the control circuit is configured to control the switch directly.

9. The lighting device of claim 1, wherein:
the protective operation of limiting the current supplied to the light source comprises causing the current to flow only intermittently during the protective operation.

10. The lighting device of claim 9, wherein:
the power conversion circuit includes a protective circuit;
the protective circuit includes a switch connected in series with the step-down switching device between the high voltage side input terminal and the high voltage side output terminal;
the control circuit is configured to keep the switch on in the lighting operation and to keep the switch off in the protective operation; and
the protective circuit includes a positive temperature coefficient thermistor connected in parallel with the switch.

11. An illuminating fixture comprising:
the lighting device of claim 1; and
the light source.

* * * * *